United States Patent [19]

Rapson, Jr. et al.

[11] 4,272,985
[45] Jun. 16, 1981

[54] METHOD OF AND APPARATUS FOR COMPENSATING FOR TEMPERATURE IN LEAK TESTING

[75] Inventors: William J. Rapson, Jr.; Leroy C. Delatorre; Charles L. Thompson, all of Houston, Tex.

[73] Assignee: Uson Corporation, Houston, Tex.

[21] Appl. No.: 99,777

[22] Filed: Dec. 3, 1979

[51] Int. Cl.$^3$ ............................................ G01M 3/26
[52] U.S. Cl. ...................................................... 73/49.2
[58] Field of Search .................... 73/38, 40, 49.2, 49.3

[56] References Cited

U.S. PATENT DOCUMENTS

| | | | |
|---|---|---|---|
| 3,039,295 | 6/1962 | LeMat et al. | 73/49.2 |
| 3,413,840 | 12/1968 | Basile et al. | 73/40 |
| 3,509,758 | 5/1970 | Newman | 73/49.2 |
| 3,872,712 | 3/1975 | Westervelt et al. | 73/40 |
| 3,987,664 | 10/1976 | Hass et al. | 73/49.2 |

Primary Examiner—James J. Gill
Attorney, Agent, or Firm—Fulbright & Jaworski

[57] ABSTRACT

A method and apparatus for testing for leaks in a test item which has a temperature different from ambient temperature in which the test item is sealed at atmospheric pressure and the pressure of the sealed air in the test item is measured. The rate of change of the pressure of the sealing air due to the non-ambient temperature of the test item is calculated for providing a temperature correction signal proportional to the temperature of the test item and the temperature correction signal is stored. The test item is then subjected to a leak test pressure, any change in the pressure of the pressurized test item is measured and the stored correction signal is applied to the pressure measurement for determining the extent of any leak in the test item while compensating for the temperature of the test item. The temperature correction signal is obtained by differentiating the pressure measurement of the sealed test item in ambient air at ambient pressure, is stored, is integrated, and is inverted and applied to the pressure measurement obtained during the normal pressure decay test time.

7 Claims, 3 Drawing Figures

TYPICAL MECHANICAL INSTALLATION

TYPICAL MECHANICAL INSTALLATION

METHOD OF AND APPARATUS FOR COMPENSATING FOR TEMPERATURE IN LEAK TESTING

BACKGROUND OF THE INVENTION

As described in U.S. Pat. No. 3,800,586, pressure decay leak testing is a way of determining leakage in a test item by pressurizing the test item to a given pressure, closing off the pressure source, and monitoring the decay in pressure which is a function of leakage. However, there are some leak testing applications in which the part to be tested is not at ambient temperature or the temperature of the testing fluid, but has a temperature different from ambient temperature. If this non-ambient test item is pressurized with air at ambient temperature, the test item will tend to heat or cool the air causing pressure changes due to temperature differences thereby causing an error in the pressure decay measurement.

SUMMARY

The present invention is directed to a method and an apparatus for testing leaks in a test item and for compensating for leak rate pressure measurement errors incurred when testing hot or cold test items.

Yet a further object of the present invention is the provision of a method and apparatus for compensating for the non-ambient temperature of test items during leak testing in which the test item is sealed with ambient air at atmospheric pressure and the pressure of the sealed air is measured. The rate of change of the pressure sealed in the test item is calculated for providing a temperature correction signal proportional to the temperature of the test item and the correction signal is stored. The test item is then pressurized and the decay in pressure is monitored which is a function of leakage. The temperature correction signal is applied to the pressure measurement for determining the extent of any leak in the test item as well as compensating for the temperature of the test item.

Yet a further object of the present invention is the provision of the method and apparatus for testing leaks in a test item having a temperature different than ambient air temperature which includes means for sealing the test item in ambient air at atmospheric pressure. Transducer means measure the pressure in the test item and differential means are connected to the transducer output for calculating the rate of change of the pressure of the air sealing the test item for providing a temperature correction due to the temperature of the test item. Storage means store the temperature correction signal. Means are provided for pressurizing the test item to a given test pressure. The transducer measures the pressurized air and an integrator and inverter are connected between the storing mans and the transducer for applying the temperature correction signal to the transducer measurement while the transducer monitors the pressurized item for a leak.

Other and further objects, features and advantages will be apparent from the following description of a presently preferred embodiment of the invention, given for the purpose of disclosure, and taken in conjunction with the accompanying drawings where like character references designate like parts throughout the several views.

DESCRIPTION OF THE PREFERRED EMBODIMENT

While the temperature compensation feature of the present invention will be described, for purposes of illustration only, in combination with a model 310 pressure decay leak tester of Uson Corporation, it is understood that the present invention may be used for other types of leak detection.

Figure 1:
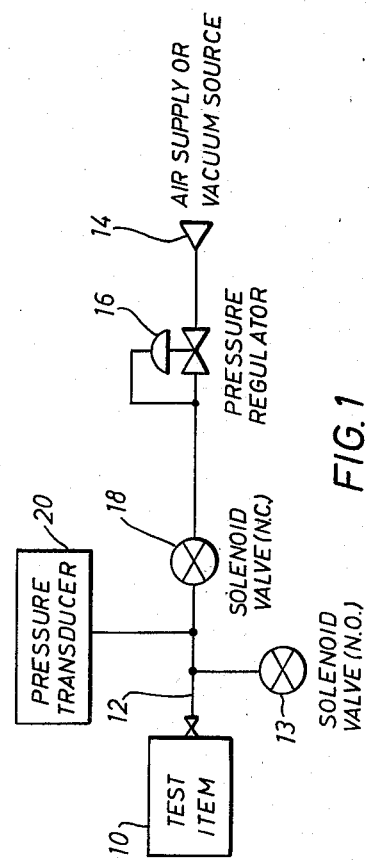
FIG. 1 is a schematic of the mechanical installation of the present invention.

Referring now to the drawings, particularly to FIG. 1, the test item 10 which is to be tested is connected to a line 12 and a conventional pressure transducer 20 which measures any change in pressure in the test item 10. If desired, a valve 13 normally opened to the atmosphere may be connected to line 12 to insure that the air sealed in test item 10 is not pressurized when sealed. After sealing, the valve 13 is closed. Initially, a normally closed solenoid valve 18 connected to line 12 isolates the test item 10 trapping ambient temperature air at atmospheric pressure in the test item 10 whereby the pressure transducer 20 may measure the change in pressure of the sealed test item 10. In this step of the operation, the pressure transducer 20 will measure pressure changes in the ambient temperature of the trapped air caused by the temperature of the test item 10 if the temperature of the test item 10 is different from the ambient temperature of the air or other testing gas. That is, if the test item 10 is hotter or cooler than the ambient air the test item will tend to heat or cool, respectively, the trapped air and the pressure measurement of the transducer 20 is indicative of the temperature of the test item 10. In addition, the test line 12 is connected through solenoid valve 18 to a pressurized gas from a suitable gas testing supply such as air or a vacuum source 14 through a pressure regulator 16. When the solenoid valve 18 is opened, the test item 10 is subjected to a pressurized gas or vacuum, the valve 18 is closed and the transducer 20 then measures any pressure changes in the test item 10 which is an indication and measurement of the extent of a leak, if any, in the test item 10. As will be more fully explained hereinafter, the pressure measurement initially made while the test item 10 is sealed under ambient air at atmospheric pressure is combined with the second measurement by the transducer 20 of the pressurized air for determining the extent of any leak in the test item while compensating for the temperature of the test item 10.

Figure 2:
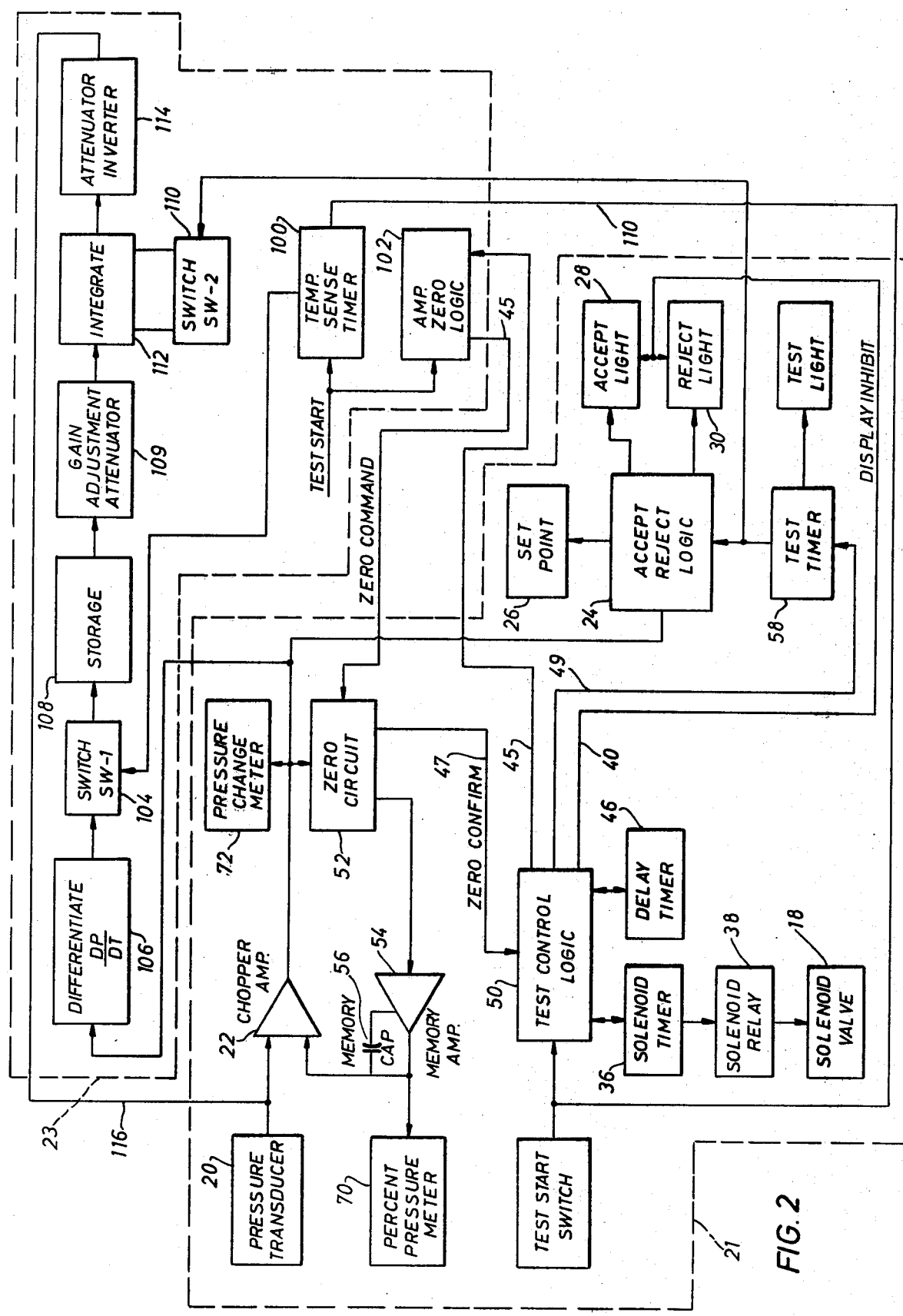
FIG. 2 is an electrical block diagram of the present invention.

Referring now to FIG. 2 the dotted outline 21 is directed to a leak tester as generally disclosed in U.S. Pat. No. 3,800,586 and the dotted outline indicated by the reference numeral 23 generally indicates the automatic temperature compensation circuit of the present invention which compensates leak rate measurement errors incurred when the test item 10 has a temperature different from the ambient temperature of the testing gas. The pressure transducer 20 continuously measures the trapped pressure in the test item 10 and its output is transmitted to a chopper amplifier 22. Initially, the test is made by connecting the test item 10 to the line 12 with the solenoid valve 18 in the closed position and with valve 13 being moved from the open position to the closed position after the connection is made. The test is started by the actuation, either manually or automatically, of the temperature sense timer 100 and the amplifier zero logic 102. Actuation of the timer 100 turns on switch 104 and actuation of the zero logic 102 extends a zero command through line 45 to the zero circuit 52 to in turn send a signal through a memory amplifier 54 and a memory retaining means such as capacitor 56 for zeroing the amplifier 22 and releasing it to measure any pressure changes in the test item 10 by the pressure transducer 20. Any pressure changes in the trapped ambient air in the test item 10 is an indicia of the temperature of the test item 10 and the measured changing pressure is transmitted to a differentiator 106 which calculates the rate of pressure change which is then transmitted through the open switch 104 to storage means 108. That is, the pressure rate of change calculation provides a temperature correction signal proportional to the temperature of the test item and thus latches or stores a voltage that is proportional to the pressure rate of change in the storage 108. After the pressure rate of change is measured, the temperature sense timer 100 turns off, closing switch 104 and sends a signal through line 110 to start the basic leak test cycle. Starting of the test cycle actuates the test control logic 50 which in turns actuates the solenoid timer 36, actuates solenoid relay 38 for opening the normally closed solenoid valve 18 to allow an air supply or vacuum to pressurize the test item 10. At the same time, the test control logic 50 inhibits through line 40 the actuation of the indicator light 28 and 30.

After predetermined length of time sufficient to pressurize test item 10, the solenoid timer 36 deactuates the solenoid valve 18 trapping the pressurized air in the test item 10. If desired, a delay timer 46 may be provided to delay the start of the test measurement to allow for pressure stabilization in the test item 10.

The pressure transducer 20 measures the pressured air in the test item 12 and transmits the measurement to the amplifier 22. The delay timer 46 actuates through line 45 and to zero circuit 52 the zeroing memory circuit 54. The zeroing and memory circuit 52 and 54 is used to establish an artificial zero reference against which pressure deviation in the test item 10 may be measured. If desired, the compensation circuit of U.S. Pat. No. 3,800,586 may be included to compensate for adiabatic heating when pressurizing the test item.

When the zero circuit 52 has reached zero, it actuates the test timer 58 by means of the zero confirm signal line 47 through line 49 which enables the accept reject logic circuit 24. The logic circuit 24 is a go no-go logic circuit which determines whether the output from the amplifier 22 is above or below a predetermined amount which is determined by adjusting a set point 26.

The test timer 58 in addition to actuating the logic 24 also actuates switch 110 which enables the integrator 112 whereby the previously stored pressure rate of change temperature signal stored in the storage means 108 is converted back to a changing voltage, and inverted by inverter 114 and by line 116 is applied to the input of the chopper amplifier 22 along with the pressure transducer 20 measurement. Therefore, the temperature correction signal is applied to the pressure transducer measurement to null and compensate for the non-ambient temperature effect of the test item 10 on the pressurized air during the leak test. Gain adjustment attenuator 109 may be provided to adjust the gain of the correcting signal to properly compensate the measurement.

The input to the amplifier 22 from the pressure transducer 20 and the inverter 114 is compared with the initial pressure now stored in the memory capacitor 56 and the pressure decline from this initial pressure is transmitted by the amplifier 22 to the logic circuit 24 for the test period set by the timer 58 to determine possible leakage of the test item 10 while automatically compensating for the temperature of the test item 10. That is, the logic circuit 24, after the predetermined test interval, measures the amount of pressure change in the test item 10 by means of the transducer 20 and amplifier 22, and if the amount of pressure change is below the set point, signal light 28 lights up indicating the test specimen is acceptable. If the pressure change which is measured by the logic circuit 24 is above the test point, the circuit 24 actuates light 30 indicating that the test item 10 has an unacceptable leak and is therefore rejected.

Meter 70 may be used to measure percent pressure and meter 72 provides a reading of the change in pressure of the test item 10.

Figure 3:
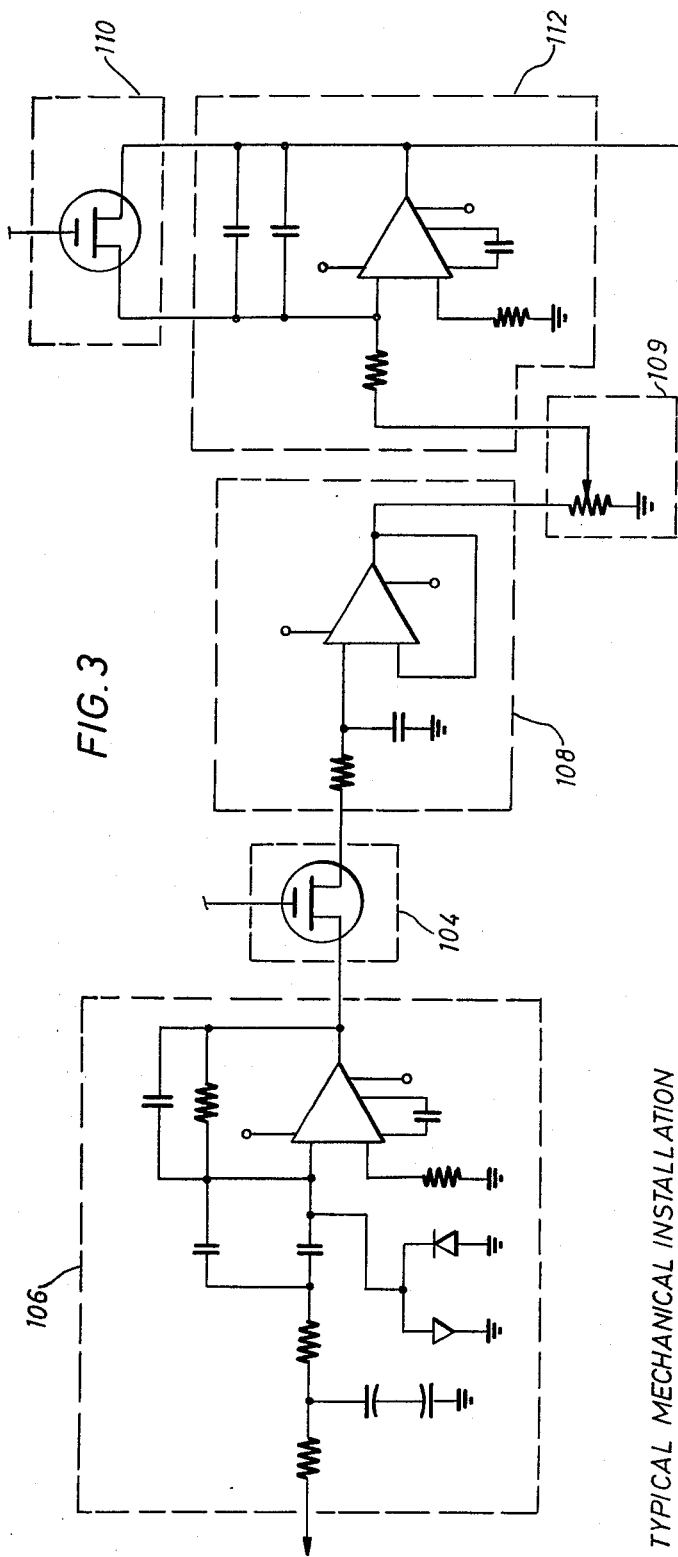
FIG. 3 is an electrical schematic of the temperature compensation system of the present invention.

While the detailed circuits of the components of the automatic temperature compensation circuit 23 shown in block form in FIG. 2 are generally textbook circuits, for purposes of fuller illustration, the circuits are shown in greater detail in schematic form in FIG. 3.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. An apparatus for testing leaks in a test item having a temperature different than ambient temperature comprising, means for sealing the test item in ambient air, transducer means for measuring the pressure in the test item, means conducted to the transducer means for measuring the rate of change of the pressure of the air sealing the test item for providing a temperature correction, means connected to the measuring means for storing the rate of change measurement, means for subjecting the test item to a pressurized fluid, and means connected between the storing means and the transducer for applying a temperature correction signal to the transducer measurement while testing for a leak in the test item.

2. The apparatus of claim 1 wherein the means for measuring the rate of change includes a differentiator.

3. The apparatus of claim 1 wherein the means for applying a temperature correction signal includes an integrator.

4. The apparatus of claim 3 wherein the means for applying a temperature correction signal includes an inverter connected to the output of the integrator.

5. An apparatus for testing leaks in a test item having a temperature different than ambient air temperature comprising, means for sealing the test item in ambient air at atmospheric pressure, transducer means for measuring the pressure in the test item, differential means connected to the transducer output for calculating the rate of change of the pressure of the air sealing the test item for providing a temperature correction signal due to the temperature of the test item, means connected to the differential means storing the temperature correction signal, means for subjecting the test item to pressurized air, and integrator and inverter means connected between the storing means and the transducer for applying a temperature correction signal to the transducer meansurement while the transducer tests the pressurized item for a leak.

6. A method of testing for leaks in a test item having a temperature different from the temperature of the testing gas comprising, sealing the test item with testing fluid at atmospheric pressure, measuring the rate of change of the pressure of the testing gas sealing the test item for providing a temperature correction signal proportional to the temperature of the test item, storing the correction signal, pressurizing the test item with the testing fluid, and measuring the change in the pressure of the pressurized test item and applying the stored correction signal to the pressure of the pressurized test item and applying the stored correction signal to the pressure measurement for determining the extent of any leak in the test item while compensating for the temperature of the test item.

7. A method of testing for leaks in a test item having a temperature different from ambient temperature comprising, sealing the test item in ambient air at atmospheric pressure, measuring the pressure in the sealed test item, calculating the rate of change of the pressure of the air sealing the test item for providing a temperature correction signal proportional to the temperature of the test item, storing the correction signal, pressurizing the test item, measuring the change in the pressure of the pressurized test item from a zero for a predetermined time and simultaneously integrating the stored correction signal, inverting the integrated signal and applying the inverted signal to the pressure measurement for determining the extent of a leak in the test item while compensating for the temperature of the test item.

* * * * *

UNITED STATES PATENT OFFICE
CERTIFICATE OF CORRECTION

Patent No. 4,272,985                     Dated  June 16, 1981

Inventor(s)  William J. Rapson, Jr. et al.

It is certified that error appears in the above-identified patent and that said Letters Patent are hereby corrected as shown below:

Column 4, line 46, cancel "conducted" and insert -- connected --

Signed and Sealed this

Twenty-second Day of September 1981

[SEAL]

Attest:

GERALD J. MOSSINGHOFF

Attesting Officer            Commissioner of Patents and Trademarks